(12) United States Patent
Oshio

(10) Patent No.: US 7,537,710 B2
(45) Date of Patent: May 26, 2009

(54) METHOD FOR PRODUCING NITRIDOSILICATE-BASED COMPOUND, NITRIDOSILICATE PHOSPHOR, AND LIGHT-EMITTING APPARATUS USING THE NITRIDOSILICATE PHOSPHOR

(75) Inventor: Shozo Oshio, Osaka (JP)

(73) Assignee: Panasonic Corporation, Osaka (JP)

( * ) Notice: Subject to any disclaimer, the term of this patent is extended or adjusted under 35 U.S.C. 154(b) by 293 days.

(21) Appl. No.: 10/576,946

(22) PCT Filed: Nov. 17, 2004

(86) PCT No.: PCT/JP2004/017431

§ 371 (c)(1),
(2), (4) Date: Apr. 25, 2006

(87) PCT Pub. No.: WO2005/049763

PCT Pub. Date: Jun. 2, 2005

(65) Prior Publication Data

US 2007/0040152 A1    Feb. 22, 2007

(30) Foreign Application Priority Data

Nov. 19, 2003  (JP)  .............. 2003-389695
May 19, 2004   (JP)  .............. 2004-149616

(51) Int. Cl.
- C01B 21/06 (2006.01)
- C09K 11/08 (2006.01)
- C09K 11/79 (2006.01)
- C09K 11/80 (2006.01)

(52) U.S. Cl. .......... 252/301.4 F; 252/301.6 F; 423/263; 423/351; 423/324

(58) Field of Classification Search ........... 252/301.4 F, 252/301.6 F; 423/263, 351, 324
See application file for complete search history.

(56) References Cited

U.S. PATENT DOCUMENTS 4,851,205 A * 7/1989 Mitomo .............. 423/327.1
5,292,489 A * 3/1994 Fanelli et al. .......... 423/21.1

(Continued)

FOREIGN PATENT DOCUMENTS

EP    1 104 799    6/2001

(Continued)

OTHER PUBLICATIONS

Schlieper, et al., "Nitrido-Silicates. II, High Temperature Syntheses and Crystal Structures of $Sr_2Si_5N_8$ and $Ba_2Si_5N_8$", Z. anorg. allg. Chem. 621 (1995) 1380-1384.

(Continued)

Primary Examiner—C. Melissa Koslow
(74) Attorney, Agent, or Firm—Hamre, Schumann, Mueller & Larson, P.C.

(57) ABSTRACT

A nitridosilicate-based compound is produced by reacting an alkaline-earth metal compound capable of generating an alkaline-earth metal oxide by heating or a rare earth compound capable of generating a rare earth oxide by heating with at least a silicon compound, while the alkaline-earth metal compound or the rare earth compound is being reduced and nitrided by the reaction with carbon in an atmosphere of nitriding gas. Because of this, a nitridosilicate-based compound of high quality can be produced industrially at low cost.

14 Claims, 5 Drawing Sheets

U.S. PATENT DOCUMENTS

| | | | |
|---|---|---|---|
| 7,144,524 B2 * | 12/2006 | Sakata et al. ......... | 252/301.4 F |
| 2002/0105269 A1 | 8/2002 | Ellens et al. | |
| 2003/0030368 A1 | 2/2003 | Ellens et al. | |
| 2003/0052595 A1 | 3/2003 | Ellens et al. | |
| 2003/0094893 A1 | 5/2003 | Ellens et al. | |

FOREIGN PATENT DOCUMENTS

| | | |
|---|---|---|
| JP | 2002-322474 | 11/2002 |
| JP | 2003-124527 | 4/2003 |
| JP | 2003-515655 | 5/2003 |
| JP | 2003-515665 | 5/2003 |
| JP | 2003-203504 | 7/2003 |
| JP | 2003-206481 | 7/2003 |

OTHER PUBLICATIONS

Huppertz, et al., "$Eu_2Si_5N_8$ and $EuYbSi_4N_7$. The First Nitridosilicates with a Divalent Rare Earth Metal", Acta Cryst. (1997) C53, 1751-1753.

Hoppe, et al., "Luminescence in $Eu^{2+}$-doped $Ba_2Si_5N_8$: fluorescence, thermoluminecence, and upconversion", J. Phys. chem.. Solids, 61 (2000) 2001-2006.

W. Schnick, "Nitridosilicates, oxonitridosilicates (sions), and oxonitridoaluminosilicates (sialons) New Materials with promising properties", Int. J. Inorg. Mater., 3 (2001) 1267-1272.

Uheda, et al., "Temperature dependence of the red phosphor, $CaSiN_2:Eu^{2+}$", Extended Abstracts of 71st Meeting of the Japan Societey of Electrochemstriy, p. 75 (2004) with its English Translation.

Lee, et al., "Development and Luminescent Charactreistics of $CaSiN_2$ Based Phosphors", Journal of the Korean Institute of Telematics & Electronics, vol. 36-D, No. 10, (1999) 31-36.

Huppertz, et al., "Edge-sharing $SiN_4$ Tetrahedra in the Highly Condensed Nitridosilicate $BaSi_7N_{10}$", Chemistry-A European Journal, vol. 3, No. 2, (1997) 249-252.

Schlieper, et al., "Nitrido Silicates. I. High Temperature Synthesis and Crystal Structure of $Ca_2Si_5N_8$", Z. anorg. allg. Chem. 621 (1995) 1037-1041.

* cited by examiner

US 7,537,710 B2

METHOD FOR PRODUCING NITRIDOSILICATE-BASED COMPOUND, NITRIDOSILICATE PHOSPHOR, AND LIGHT-EMITTING APPARATUS USING THE NITRIDOSILICATE PHOSPHOR

TECHNICAL FIELD

The present invention relates to a method for producing a nitridosilicate-based compound (e.g., compounds containing at least an alkaline-earth metal element or a rare earth element, a silicon element, and a nitrogen element, such as nitridosilicates, oxonitridosilicates, nitridoaluminosilicates, oxonitridoaluminosilicates, and the like) applicable as a ceramic material, a phosphor material, or the like; a nitridosilicate phosphor; and a light-emitting apparatus using the nitridosilicate phosphor.

BACKGROUND ART

Conventionally, a nitridosilicate-based compound containing as major elements at least (1) an alkaline-earth metal element M (where M is at least one element selected from Mg, Ca, Sr, and Ba), (2) silicon, and (3) nitrogen, and a nitridosilicate-based compound containing as major elements at least (1) a rare earth element Ln (where Ln is at least one element selected from rare earth elements of atomic numbers 21, 39, and 57-71), (2) silicon, and (3) nitrogen are known.

Examples of the above-mentioned nitridosilicate-based compound include $Sr_2Si_5N_8$, $Ba_2Si_5N_8$ (see Patent documents 1-3, and Non-patent document 1 described below), $BaSi_7N_{10}$ (see Patent documents 1-3 described below), $SrSiAl_2O_3N_2$, $Sr_2Si_4AlON_7$, $La_3Si_6N_{11}$ (see Patent document 4 described below), $Eu_2Si_5N_8$, $EuYbSi_4N_7$ (see Non-patent document 2 described below), $(Ba, Eu)_2Si_5N_8$ (see Non-patent document 3 described below), $Ce_4(Si_4O_4N_6)O$, $Sr_3Ce_{10}Si_{18}Al_{12}O_{18}N_{36}$ (see Non-patent document 4 described below), $CaSiN_2$ (see Non-patent document 5 described below), and the like. In the present specification, SIALON (see Patent document 5 described below) represented by a general formula: $M_{p/2}Si_{12-p-q}Al_{p+q}O_qN_{16-q}$ (where M is Ca or Ca combined with Sr; q is 0 to 2.5; and p is 1.5 to 3) is excluded.

It is known that the above-mentioned $CaSiN_2$ becomes a $CaSiN_2$:$Eu^{2+}$ phosphor emitting red light having an emission peak in the vicinity of 630 nm by being activated with $Eu^{2+}$ ions being a luminescent center. The following also is known: the excitation spectrum of the above-mentioned phosphor has a peak in the vicinity of 370 nm, and although the phosphor does not emit red light with a high intensity at excitation of blue light in a range of 440 nm to less than 500 nm, it emits red light with a strong output at near-ultraviolet light excitation in a range of 330 to 420 nm. Therefore, the application to a light-emitting apparatus using a light-emitting element emitting near-ultraviolet light as an excitation source is considered to be promising (see Non-patent document 5 described below).

Furthermore, the following also is known: the above-mentioned nitridosilicate-based compound can be applied as a phosphor material as well as a ceramic material, and the above-mentioned nitridosilicate-based compound, for example, containing $Eu^{2+}$ ions and $Ce^{3+}$ ions becomes a high-efficiency phosphor (see Patent documents 1 to 6 described below).

Furthermore, it also is known that the above-mentioned high-efficiency phosphor composed of a nitridosilicate-based compound is suitable as an LED light source, since it is excited with near-ultraviolet light to blue light, and emits visible light of blue, green, yellow, orange, or red (see Patent documents 1 to 3, and Non-patent document 5 described below).

Conventionally, in order to produce the above-mentioned nitridosilicate-based compound, a production method has been used, in which alkaline-earth metal (metal Ca, metal Sr, metal Ba, etc.) or a nitride of alkaline-earth metal ($Ca_3N_2$, $Sr_3N_2$, $Ba_3N_2$, etc.) is used as a supply source of alkaline-earth metal, and rare earth metal (metal La, metal Ce, metal Eu, etc.) is used as a supply source of a rare earth element, without using a reducing agent (solid-state carbon, etc. described below) excluding alkaline-earth metal and rare earth metal (see Patent documents 1-6, and Non-patent documents 1-4).

On the other hand, conventionally, the use of a phosphor of a nitridosilicate-based compound produced by such a production method in a light-emitting apparatus such as an LED light source has been studied.

(Patent document 1) JP2003-515655A
(Patent document 2) JP2003-515665A
(Patent document 3) JP2002-322474A
(Patent document 4) JP2003-206481A
(Patent document 5) JP2003-203504A
(Patent document 6) JP2003-124527A
(Non-patent document 1) T. Schlieper et al., Z. an org. allg. Chem., Vol. 621, (1995), pages 1380-1384
(Non-patent document 2) H. Huppertz and W. Schnick, Acta Cryst., Vol. 53, (1997), pages 1751-1753
(Non-patent document 3) H. A. Hoppe et al., J. Phys. Chem. Solids, Vol. 61 (2000), pages 2001-2006
(Non-patent document 4) W. Schnick, Int. J. Inorg. Mater., Vol. 3 (2001), pages 1267-1272
(Non-patent document 5) K. Ueda et al., Extended Abstracts of 71st Meeting of The Japan Society of Electrochemistry (2004), page 75

However, according to the conventional method for producing a nitridosilicate-based compound, above all, a method for producing a highly nitrided nitridosilicate-based compound (e.g., $M_2Si_5N_8$, $MSi_7N_{10}$, $M_2Si_4AlON_7$, $MSiN_2$ (where M is at least one element selected from Mg, Ca, Sr, and Ba), etc.) with a small number of oxygen atoms, in particular, a nitridosilicate-based compound containing substantially no oxygen component, alkaline-earth metal or rare earth metal, which is chemically unstable and has the danger of ignition, or a nitride of alkaline-earth metal or rare earth nitride, which is difficult to obtain, is very expensive, and is difficult to handle, is used as a supply source of alkaline-earth metal or a rare earth element. Therefore, the above-mentioned method has the following problems, which makes it very difficult to industrially produce a nitridosilicate-based compound.

(1) It is difficult to mass-produce a nitridosilicate-based compound.

(2) It is difficult to produce a high purity compound of high quality with satisfactory reproducibility.

(3) It is difficult to provide an inexpensive compound.

Since the conventional production method has such problems, the conventional nitridosilicate-based compound has the following problems: (1) low purity due to the presence of a large amount of impurity oxygen; (2) low material performance such as low emission performance of a phosphor caused by the low purity; (3) high cost; and the like. For example, the conventional light-emitting apparatus using the conventional nitridosilicate-based phosphor as a light-emitting source has the following problems: (1) low luminous flux and brightness; (2) high cost; and the like.

DISCLOSURE OF INVENTION

The present invention is a method for producing a nitridosilicate-based compound, including reacting a material containing an alkaline-earth metal compound capable of generating an alkaline-earth metal oxide MO (where M is at least one element selected from Mg, Ca, Sr, and Ba; and O is oxygen) by heating, a silicon compound, and carbon in an atmosphere of nitriding gas.

Furthermore, the present invention is a method for producing a nitridosilicate-based compound, including reacting a material containing a rare earth compound capable of generating a rare earth oxide LnO or $Ln_2O_3$ (where Ln is at least one element selected from rare earth elements of atomic numbers 21, 39, and 57-71; and O is oxygen) by heating, a silicon compound, and carbon in an atmosphere of nitriding gas.

Furthermore, the present invention is a method for producing a nitridosilicate-based compound, including reacting a material containing at least one selected from alkaline-earth metal, a nitride of alkaline earth metal, rare earth metal, and a rare earth nitride, a silicon compound, and carbon in an atmosphere of nitriding gas.

Furthermore, the present invention is a nitridosilicate phosphor including a nitridosilicate compound represented by a general formula: $MSiN_2$ as a phosphor base material, and $Eu^{2+}$ ions as a luminescent center, wherein a main component of the M is Ba.

Furthermore, the present invention is a light-emitting apparatus using the above-mentioned nitridosilicate-based phosphor as a light-emitting source

BEST MODE FOR CARRYING OUT THE INVENTION

Figure 1:
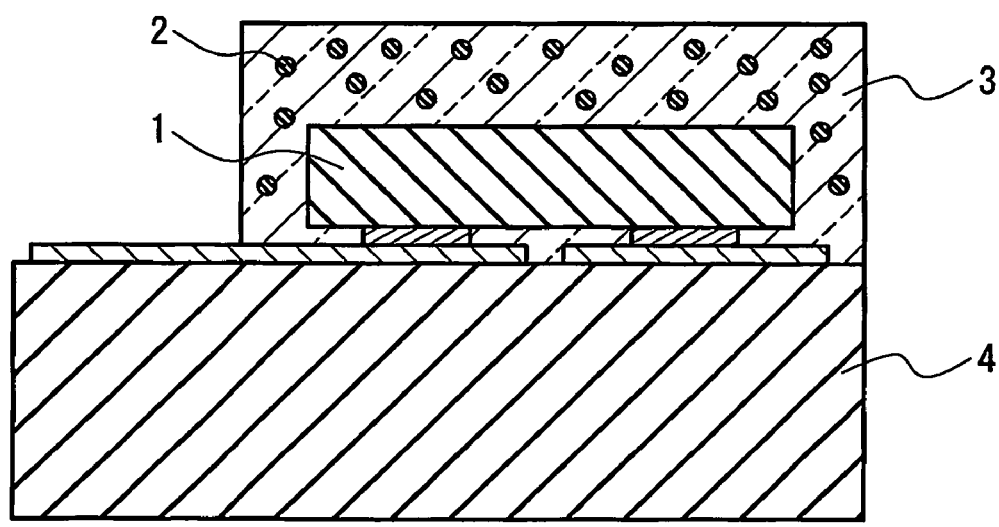
FIG. 1 is a cross-sectional view showing an exemplary light-emitting apparatus using a nitridosilicate-based phosphor.

According to the present invention, a nitridosilicate-based compound can be produced using an alkaline-earth metal salt, a rare earth oxide, or the like, which is easy to handle and obtain, and is inexpensive, as a supply source of alkaline-earth metal or a rare earth element, without using alkaline-earth metal or a nitride of alkaline-earth metal, and rare earth metal or a rare earth nitride, which is chemically unstable, is difficult to handle in the air, is difficult to obtain, and is expensive; and a nitridosilicate-based compound with satisfactory material performance and a phosphor using the same can be produced industrially with satisfactory reproducibility at low cost.

Furthermore, the present invention also can provide a nitridosilicate-based compound and a nitridosilicate-based phosphor that are inexpensive and have high performance, and an applied product (such as an LED light source) of a nitridosilicate-based compound that is inexpensive and has high performance.

Hereinafter, the present invention will be described by way of an embodiment.

According to an exemplary method for producing a nitridosilicate-based compound (including a nitridosilicate-based phosphor) of the present invention, an alkaline-earth metal compound capable of generating an alkaline-earth metal oxide MO (where M is at least one element selected from Mg, Ca, Sr, and Ba) by heating is reacted with at least a silicon compound, while being reduced and nitrided by the reaction with carbon in an atmosphere of nitriding gas.

Furthermore, according to another exemplary method for producing a nitridosilicate-based compound of the present invention, a rare earth compound capable of generating a rare earth oxide LnO or $Ln_2O_3$ (where Ln is at least one element selected from rare earth elements of atomic numbers 21, 39, and 57-71) by heating is reacted with at least a silicon compound, while being reduced and nitrided by the reaction with carbon in an atmosphere of nitriding gas.

Thus, as a supply source of alkaline-earth metal or a rare earth element constituting the above-mentioned nitridosilicate-based compound, an alkaline-earth metal compound or a rare earth compound that is inexpensive and easy to handle, such as a carbonate, an oxalate, a hydride, and an oxide, can be used.

Furthermore, a supply material (carbon, a silicon compound, etc.) and supply gas (nitrogen gas, etc.) other than the alkaline-earth metal or a rare earth element used for producing the nitridosilicate-based compound also are relatively easy to obtain, are easy to handle, and are inexpensive. Therefore, the nitridosilicate-based compound can be provided with satisfactory reproducibility at low cost.

Furthermore, a firing material can be reduced actively due to the reaction with carbon as a reducing agent, and an oxygen component in the firing material can be removed as carbon oxide gas or carbon dioxide gas. Therefore, the mixed amount of impurity oxygen in the nitridosilicate-based compound is decreased, the purity of the nitridosilicate-based compound is enhanced, and consequently, various performances can be exhibited more highly.

The functional effect regarding the enhancement of material performance is exhibited in the case of producing a highly nitrided nitridosilicate-based compound in which the number of atoms of oxygen is smaller than that of alkaline-earth metal, and a highly nitrided nitridosilicate-based compound in which the number of atoms of oxygen is smaller than the number obtained by multiplying the number of atoms of rare earth metal by 1.5, per mol of the nitridosilicate-based compound. In particular, the functional effect becomes conspicuous in the production of a nitridosilicate-based compound (e.g., $M_2Si_5N_8$ and $M_2Si_5N_8:Eu^{2+}$ phosphor, $MSiN_2$ and $MSiN_2:Eu^{2+}$ phosphor) containing no oxygen component.

Herein, the nitridosilicate-based compound of the present invention refers to a compound containing at least an alkaline-earth metal element or a rare earth element, silicon, and nitrogen, such as nitridosilicates, oxonitridosilicates, nitridoaluminosilicates, oxonitridoaluminosilicates, etc. In the present specification, SIALON represented by a general formula: $M_{p/2}Si_{12-p-q}Al_{p+q}O_qN_{16-q}$ (where M is Ca or Ca combined with Sr; q is 0 to 2.5; and p is 1.5 to 3) is excluded.

The production method of the present invention is a method for producing a nitridosilicate-based compound that can be called, for example, a reducing nitriding reaction method. In particular, the production method of the present invention is suitable for industrial production of a powder-shaped nitridosilicate-based compound.

The above-mentioned alkaline-earth metal compound is not particularly limited as long as it is an alkaline-earth metal compound capable of generating the above-mentioned alkaline-earth metal oxide MO. In terms of the availability of a high-purity compound, the ease of handling in the air, the cost, and the like, the above-mentioned alkaline-earth metal compound preferably is at least one selected from a carbonate, an oxalate, a nitrate, a sulfate, an acetate, an oxide, a peroxide, and a hydride of alkaline-earth metal; more preferably is a carbonate, an oxalate, an oxide, and a hydride of an alkaline-earth metal; and most preferably a carbonate of alkaline-earth metal. Furthermore, for the purpose of obtaining a high-purity nitridosilicate-based compound, preferable M is at least one element selected from Sr and Ba.

There is no particular limit to the shape of the alkaline-earth metal compound, and a powder shape, a lump shape, or the like may be selected appropriately. For the purpose of obtaining a powder-shaped nitridosilicate-based compound, a preferable shape is powder.

The rare earth compound is not particularly limited as long as it is capable of generating the above-mentioned rare earth oxide LnO or $Ln_2O_3$. In terms of the availability of a high-purity compound, the ease of handling in the air, the cost, etc., the rare earth compound preferably is at least one selected from a carbonate, an oxalate, a nitrate, a sulfate, an acetate, an oxide, a peroxide, and a hydride of a rare earth element; more preferably is a carbonate, an oxalate, an oxide, and a hydride of a rare earth element; and most preferably is a rare earth oxide.

There is no particular limit to the shape of the rare earth compound, and a powder shape, a lump shape, or the like may be selected appropriately. For the purpose of obtaining a powder-shaped nitridosilicate-based compound, a preferable shape is powder.

Furthermore, there is no particular limit to the silicon compound, as long as it is capable of forming a nitridosilicate-based compound by the above-mentioned reaction. For the same reason as that in the case of the above-mentioned alkaline-earth metal compound and rare earth compound, the silicon compound preferably is silicon nitride ($Si_3N_4$), silicon oxynitride ($Si_2ON_2$), silicon oxide (SiO or $SiO_2$), silicon diimide ($Si(NH)_2$); more preferably is at least one silicon compound selected from silicon nitride and silicon diimide; and most preferably is silicon nitride.

There is no particular limit to the shape of the above-mentioned silicon compound, and a powder shape, a lump shape, or the like may be selected appropriately. For the purpose of obtaining a powder-shaped nitridosilicate-based compound, a preferable shape is powder.

According to the production method of the present invention, the supply source of silicon may be elemental silicon. In this case, elemental silicon is reacted with nitrogen in an atmosphere of nitriding gas to form a nitride compound (silicon nitride, etc.) of silicon, and is reacted with the above-mentioned alkaline-earth metal nitride and the above-mentioned rare earth nitride. For this reason, according to the present invention, the silicon compound includes elemental silicon.

There is no particular limit to the shape of the above-mentioned carbon. A preferable shape is solid-state carbon, and above all, graphite. However, the carbon may be amorphous carbon (coals, coke, charcoal, gas carbon, etc.). In addition, for example, hydrocarbon such as natural gas that is carburizing gas, methane ($CH_4$), propane ($C_3H_8$), butane ($C_4H_{10}$), etc., and a carbon oxide such as carbon oxide (CO) may be used as a carbon supply source.

In the case of using a firing container or a heat generator made of carbon in a vacuum atmosphere or in a neutral atmosphere such as an inert gas atmosphere, a part of the carbon may be evaporated. However, in principle, it also is possible to use such evaporated carbon as a reducing agent.

Regarding the above-mentioned solid-state carbon, there is no particular limit to the size and shape. In terms of the availability, preferable solid-state carbon is powder or grains with a size of 1 μm to 1 cm. The solid-state carbon with other sizes and shapes may be used. Solid-state carbon in various shapes, such as a powder shape, a grain shape, a lump shape, a plate shape, a bar shape, and the like, can be used. There is no particular limit to the purity of the solid-state carbon. For the purpose of obtaining a nitridosilicate-based compound of high quality, the purity of the solid-state carbon preferably is as high as possible. For example, high purity carbon with a purity of 99% or higher, preferably 99.9% or higher is used.

The above-mentioned solid-state carbon to be reacted also may function as a heat generator (carbon heater) or a firing container (carbon crucible, etc.). The above-mentioned carbon used as a reducing agent may be used in combination with the materials for a nitridosilicate-based compound, or merely may be brought into contact therewith.

Furthermore, there is no particular limit to the nitriding gas as long as it is capable of effecting a nitriding reaction. In terms of the availability of high-purity gas, the ease of handling, the cost, etc., the nitriding gas preferably is at least one kind of gas selected from nitrogen gas and ammonia gas, and more preferably is nitrogen gas.

The preferable reaction atmosphere containing nitriding gas is an atmospheric pressure atmosphere for the reason of the availability of simple facilities. However, any of a high-pressure atmosphere, a pressurizing atmosphere, a reduced-pressure atmosphere, and a vacuum atmosphere may be used. The preferable reaction atmosphere for the purpose of enhancing the performance of a compound (or a phosphor) to be obtained is a high-pressure atmosphere (e.g., 2 to 100 atmospheres), and considering the handling of an atmosphere, the preferable reaction atmosphere mainly contains nitrogen gas (5 to 20 atmospheres). In such a high-pressure atmosphere, the decomposition of a compound (nitride) generated during firing at high temperature can be prevented or suppressed, and the compositional shift of a compound to be obtained is suppressed, whereby a compound with high performance can be produced. For the purpose of promoting decarbonization of a reactant (fired material), a small amount or trace amount of water vapor may be contained in the above-mentioned reaction atmosphere.

Furthermore, in order to enhance the reactivity between the reactants (compound materials), flux may be added for the reaction. As the flux, an alkaline metal compound ($Na_2CO_3$, NaCl, LiF), a halogen compound ($SrF_2$, $CaCl_2$, etc.), etc. can be appropriately selected for use.

The major features of the present invention are as follows: (1) as the material for a nitridosilicate-based compound, alkaline-earth metal or rare earth metal, or a nitride of alkaline-earth metal or a rare earth nitride is not used substantially; (2) instead, an alkaline-earth metal compound or a rare earth compound capable of generating an alkaline-earth metal oxide or a rare earth oxide by heating is used; (3) an oxygen component contained in these compounds is removed by the reaction with carbon, preferably, solid-state carbon; (4) while the alkaline-earth metal compound or rare earth compound is being nitrided by the reaction with nitriding gas; (5) the alkaline-earth metal compound or rare earth compound is reacted with a silicon compound, whereby a nitridosilicate-based compound is produced.

According to the production method of the present invention, the above-mentioned silicon compound is exposed to nitriding gas, and reacts with the above-mentioned alkaline-earth metal compound or rare earth compound while being nitrided during a reaction process between materials. Therefore, the method for producing a nitridosilicate-based compound of the present invention can be considered substantially as a method for producing a nitridosilicate-based compound by at least reacting (1) an alkaline-earth metal oxide, (2) carbon, particularly, solid-state carbon, (3) nitrogen, and (4) silicon nitride with each other, or a method for producing a nitridosilicate-based compound by at least reacting (1) a rare earth oxide, (2) carbon, particularly, solid-state carbon, (3) nitrogen, and (4) silicon nitride with each other.

Furthermore, when an aluminum compound (aluminum nitride, aluminum oxide, aluminum hydroxide, etc.) is reacted further in the above-mentioned method for producing a nitridosilicate-based compound, a nitridoaluminosilicate compound and an oxonitridoaluminosilicate compound also can be produced.

Furthermore, when a transition metal or a transition metal compound, such as metal zinc or a zinc compound (zinc oxide, zinc nitride, etc.), metalic titanium or a titanium compound (titanium oxide, titanium nitride, etc.), metalic zirconium or a zirconium compound (zirconium oxide, zirconium nitride, etc.), metalic hafnium or a hafnium compound (hafnium oxide, hafnium nitride, etc.), metalic tungsten or a tungsten compound (tungsten oxide, tungsten nitride, etc.), or metalic tin or a tin compound (tin oxide, tin nitride, etc.), is reacted further in the above-mentioned method for producing a nitridosilicate-based compound of the present invention, a nitridosilicate-based compound containing these transition metal elements also can be produced. Furthermore, when a nitridosilicate-based compound is produced by reacting phosphorus or a phosphorus compound (phosphorus pentoxide, phosphorus pentanitride, phosphates, diammonium hydrogenphosphate, etc.), a nitridosilicate-based compound containing phosphorus can be produced. When a nitridosilicate-based compound is produced by reacting boron or a boron compound (boric acid, boron nitride, boric anhydride, etc.), a nitridosilicate-based compound containing boron also can be produced.

The reaction in the production method of the present invention is started and maintained by an operation of adding energy to a reaction material, for example, by heating.

According to the method for producing a nitridosilicate-based compound of the present invention, the reaction temperature is in a range of preferably 1400° C. to 2000° C., and more preferably 1500° C. to 1800° C. Furthermore, the reaction may be performed in several sections. Thus, the above-mentioned alkaline-earth metal compound or rare earth compound becomes an alkaline-earth metal oxide or a rare earth oxide by heating, and furthermore, due to the reaction with carbon, the alkaline-earth metal oxide or the rare earth oxide is reduced while generating carbon oxide or carbon dioxide. Furthermore, the reduced alkaline-earth metal oxide or rare earth oxide reacts with other compounds such as the above-mentioned silicon compound, gas, and the like, while being nitrided with nitriding gas to form a nitride. Thus, a nitridosilicate-based compound is generated.

At a temperature lower than the above-mentioned temperature range, the above-mentioned reaction and reduction may be insufficient, which makes it difficult to obtain a nitridosilicate-based compound of high quality. At a temperature higher than the above-mentioned temperature range, a nitridosilicate-based compound is decomposed or melted, which makes it difficult to obtain a compound with a predetermined composition and shape (powder shape, molded shape, etc.), and makes it necessary to use an expensive heat generator and a heat-insulating material with high heat resistance for a production facility, resulting in an increase in facility cost. Consequently, it becomes difficult to provide a nitridosilicate-based compound at low cost.

The amounts of the materials used in the production method of the present invention may be adjusted in accordance with the composition of an intended nitridosilicate-based compound. The amount of carbon preferably is set to be an excess so as to completely reduce a predetermined amount of oxygen in an oxygen component contained in each material to be used.

According to the production method of the present invention, a number of nitridosilicate-based compounds described above, such as $CaSiN_2$, $BaSiN_2$, $Sr_2Si_5N_8$, $Ba_2Si_5N_8$, $(Sr, Eu)_2Si_5N_8$, $Eu_2Si_5N_8$, $BaSi_7N_{10}$, $Sr_2Si_4AlON_7$, and $CaAlSiN_3$, can be produced. Such a nitridosilicate-based compound can be used as a phosphor as well as a ceramic member, etc. Since a nitridosilicate-based compound such as $M_2Si_5N_8$, $MSiN_2$, and the like function as a phosphor base material of a high-efficiency phosphor, the method for producing a nitridosilicate-based compound of the present invention can be applied widely to a method for producing a nitridosilicate-based phosphor.

Furthermore, as another exemplary method for producing a nitridosilicate-based compound of the present invention, it is possible to adopt a method for reacting a material containing at least one selected from alkaline-earth metal, a nitride of alkaline-earth metal, rare earth metal, and a rare earth nitride, a silicon compound, and carbon in an atmosphere of nitriding gas. More specifically, when carbon as a reducing agent is added to alkaline-earth metal (M) or a nitride ($M_3N_2$) of alkaline-earth metal and a silicon compound such as silicon nitride ($Si_3N_4$), or rare earth metal or a nitride of rare earth metal and a silicon compound, which are used for forming a nitridosilicate-based compound, and fired in an atmosphere of nitriding gas, impurity oxygen can be removed as carbon oxide gas (CO) during firing, and the impurity oxide can be prevented or suppressed from being mixed in the compound. Therefore, a nitridosilicate-based compound with high purity and high performance can be produced.

In order to produce a nitridosilicate-based phosphor, metal or a compound containing an element to be the luminescent center only needs to be at least reacted during the above-mentioned reaction process. Examples of such an element include lanthanide of atomic numbers 58-60, or 62-71 and transition metals (in particular, Ce, Pr, Eu, Tb, and Mn). Examples of a compound containing such an element include an oxide, a nitride, a hydride, a carbonate, an oxalate, a nitrate, a sulfate, a halide, a phosphate, and the like of the above-mentioned lanthanide and transition metal.

More specifically, the present invention also may be directed to a method for producing a nitridosilicate-based phosphor by further reacting at least one of a metalic lanthanide and a lanthanide compound, excluding metalic lanthanum or metalic promethium, or a lanthanum compound and a promethium compound; or a method for producing a nitridosilicate-based phosphor by further reacting at least one of transition metal and a transition metal compound.

According to a method for producing a nitridosilicate-based phosphor containing lanthanide ions such as $Ce^{3+}$, $Pr^{3+}$, $Eu^{2+}$, and $Tb^{3+}$, or $Mn^{2+}$ ions as a luminescent center, the reaction atmosphere preferably is a reducing atmosphere.

An atmosphere of mixed gas of nitrogen and hydrogen is particularly preferable because a strong reducing force can be obtained easily at relatively low cost. Thus, the generation of ions, such as $Ce^{4+}$, $Pr^{4+}$, $Eu^{3+}$, $Tb^{4+}$, $Mn^{3+}$, etc., which do not substantially function as the luminescent center of a desired high-efficiency phosphor can be prevented, and the concentration of lanthanide ions or transition metal ions, such as $Ce^{3+}$, $Pr^{3+}$, $Eu^{2+}$, $Tb^{3+}$, $Mn^{2+}$, etc., which emit high-efficiency light, is increased. Therefore, a high-efficiency nitridosilicate-based phosphor can be provided. Furthermore, in a reducing atmosphere using hydrogen, due to the effect of decarbonization of hydrogen gas, it is expected that the purity of a fired material is enhanced.

According to the method for producing a nitridosilicate-based compound of the present invention, high-efficiency nitridosilicate-based phosphor can be provided at low cost. Typical examples of the above-mentioned nitridosilicate-based phosphor include $MSiN_2:Eu^{2+}$, $M_2Si_5N_8:Eu^{2+}$, $M_2Si_5N_8:Ce^{3+}$, $Sr_2Si_4AlON_7:Eu^{2+}$, and the like.

Such a nitridosilicate-based phosphor can be used as, for example, (1) a light-emitting source of an LED light source for illumination, (2) a wavelength conversion layer of a multi-color display inorganic thin film EL (electroluminescence) panel configured by using a blue phosphor such as $BaAl_2S_4$:$Eu^{2+}$ as a light-emitting layer and further incorporating a wavelength conversion layer, (3) a light-emitting source of warm color (yellow—orange—red) of a fluorescent lamp (discharge lamp), and the like. Furthermore, the nitridosilicate-based phosphor is excellent in temperature characteristics and maintains high emission performance even under a high temperature. Therefore, the above-mentioned light-emitting apparatus with temperature characteristics enhanced can be provided at low cost.

The method for producing a nitridosilicate-based phosphor of the present invention is suitable for industrial production of a phosphor, such as $Sr_2Si_5N_8:Eu^{2+}$, $Ba_2Si_5N_8:Eu^{2+}$, $Sr_2Si_5N_8:Ce^{3+}$, $Ba_2Si_5N_8:Ce^{3+}$, $CaSiN_2:Eu^{2+}$, $BaSiN_2:Eu^{2+}$, $Sr_2Si_4AlON_7:Eu^{2+}$, and the like, for LED illumination, which is excited with near-ultraviolet to blue light and emits high-efficiency warm color based light (yellow—orange—red light).

A $M_2Si_5N_8:Eu^{2+}$ phosphor, and the like emitting red light can be formed into an $M_2Si_5N_8:Ce^{3+}$, $Eu^{2+}$ phosphor by activating $Ce^{3+}$ ions together. For example, the excitation spectrum of $M_2Si_5N_8:Eu^{2+}$ emitting red light and the emission spectrum of $M_2Si_5N_8:Ce^{3+}$ emitting yellow-green light are overlapped with each other. Therefore, due to the above-mentioned activation of $Ce^{3+}$ ions, the energy transmission from $Ce^{3+}$ ions to $Eu^{2+}$ ions occurs, and in connection therewith, the $M_2Si_5N_8:Ce^{3+}$, $Eu^{2+}$ phosphor has its excitation spectrum shape changed to that similar to the excitation spectrum of the $M_2Si_5N_8:Ce^{3+}$ phosphor, and becomes a red phosphor exhibiting an emission efficiency higher than that of the $M_2Si_5N_8:Eu^{2+}$ phosphor under the condition of ultraviolet to near-ultraviolet excitation of 250 to 400 nm. Therefore, the $M_2Si_5N_8:Ce^{3+}$, $Eu^{2+}$ phosphor becomes a more effective red phosphor than the $M_2Si_5N_8:Eu^{2+}$ phosphor in a light-emitting apparatus using ultraviolet light or near-ultraviolet light in such a wavelength range as excited light.

The nitridosilicate-based compound produced by the production method of the present invention can be produced using an alkaline-earth metal compound or a rare earth compound, solid-state carbon or carbon-based gas, a silicon compound, and nitriding gas, which are inexpensive and easy to obtain and handle, so that the nitridosilicate-based compound can be produced simply at low cost.

Furthermore, a nitridosilicate-based compound produced by the production method of the present invention, above all, a highly nitrided nitridosilicate-based compound, i.e., a nitridosilicate-based compound in which the number of oxygen atoms is smaller than the number of atoms of alkaline-earth metal per mol of nitridosilicate-based compound or a nitrided nitridosilicate-based compound in which the number of oxygen atoms is smaller than the number obtained by multiplying the number of atoms of rare earth metal by 1.5 per mol of nitridosilicate-based compound, in particular, a nitridosilicate-based compound containing substantially no oxygen component is produced while a firing material is being reduced actively due to the reaction with carbon to be a reducing agent and an oxygen component in the firing material is removed as carbon oxide or carbon dioxide. Therefore, the above-mentioned nitridosilicate-based compound has a small mixed amount of impurity oxygen and high purity, and consequently, exhibits high performance.

Thus, an applied product (LED light source, etc.) using a nitridosilicate-based compound produced using the production method of the present invention, which is inexpensive and has high performance (high luminous flux, etc.), also can be provided.

Next, an embodiment of a light-emitting apparatus of the present invention will be described with reference to the drawings. FIG. 1 shows an example of a light-emitting apparatus (applied product) using a nitridosilicate-based phosphor as a light-emitting source. The light-emitting apparatus shown in FIG. 1 also is a light source adopting an LED. FIG. 1 also is a cross-sectional view showing an exemplary semiconductor light-emitting element used often for an illumination or display apparatus.

FIG. 1 shows a semiconductor light-emitting element with a configuration in which at least one light-emitting element 1 is mounted on a sub-mount element 4 so as to be in conduction therewith, and the light-emitting element 1 is sealed with a package of a base material (e.g., resin, glass with a low melting point, etc.) that contains at least the above-mentioned nitridosilicate-based phosphor 2 and also functions as a phosphor layer 3.

In FIG. 1, the light-emitting element 1 is a photoelectric transducer for converting electric energy into light, to which a light-emitting diode, a laser diode, a surface-emitting laser diode, an inorganic electroluminescence element, an organic electroluminescence element, and the like correspond. In particular, in terms of a high output of a light source, a light-emitting diode or a surface-emitting laser diode is preferable. Basically, the wavelength of light emitted by the light-emitting element 1 is not particularly limited, and may be in a wavelength range (e.g., 250 to 550 nm) in which a nitridosilicate-based phosphor can be excited. However, in order to produce a light source that allows a nitridosilicate-based phosphor to be excited with high efficiency and has high performance in emitting white-based light in high demand, the light-emitting element 1 is set to have an emission peak in a wavelength range of more than 340 nm to 500 nm, preferably more than 350 nm to 420 nm or more than 420 nm to 500 nm, more preferably more than 360 nm to 410 nm or more than 440 nm to 480 nm, i.e., in a near-ultraviolet or blue wavelength region.

Furthermore, in FIG. 1, the phosphor layer 3 includes at least the nitridosilicate-based phosphor 2. For example, the phosphor layer 3 is configured by dispersing at least the nitridosilicate-based phosphor 2 in a transparent base material such as transparent resin (epoxy resin, silicon resin, etc.), glass with a low melting point, or the like. The content of the nitridosilicate-based phosphor 2 in the transparent base material is, for example, preferably 5 to 80% by mass, and more preferably 10 to 60% by mass in the case of the above-mentioned transparent resin. The nitridosilicate-based phosphor 2 contained in the phosphor layer 3 is a light conversion material for absorbing a part of or entire light emitted by the driven light-emitting element 1 and converting the absorbed light into visible light (blue, green, yellow, orange, or red light) with a wavelength longer than the peak wavelength of light emitted by the light-emitting element 1. Therefore, the nitridosilicate-based phosphor 2 is excited by the light-emitting element 1, and the semiconductor light-emitting element emits light containing at least an emission component emitted by the nitridosilicate-based phosphor 2.

Thus, for example, when a light-emitting apparatus is produced with the following combination configurations, light emitted by the light-emitting element 1 is mixed with light emitted by the phosphor layer 3 to obtain white-based light, resulting in a light source emitting white-based light in high demand.

(1) Configuration in which a light-emitting element that emits near-ultraviolet light, a blue phosphor, a green phosphor, and a red phosphor.

(2) Configuration in which a light-emitting element that emits near-ultraviolet light, a blue phosphor, a green phosphor, a yellow phosphor, and a red phosphor.

(3) Configuration in which a light-emitting element that emits near-ultraviolet light, a blue phosphor, a yellow phosphor, and a red phosphor.

(4) Configuration in which a light-emitting element that emits blue light, a green phosphor, a yellow phosphor, and a red phosphor.

(5) Configuration in which a light-emitting element that emits blue light, a yellow phosphor, and a red phosphor.

(6) Configuration in which a light-emitting element that emits blue light, a green phosphor, and a red phosphor.

(7) Configuration in which a light-emitting element that emits blue-green light, and a red phosphor.

A nitridosilicate-based phosphor emitting red light, such as $Sr_2Si_5N_8:Eu^{2+}$ and $CaSiN_2:Eu^{2+}$, exhibits a high inner quantum efficiency under blue light excitation. Thus, when a light-emitting apparatus is configured in the following manner: as an excitation source for such a nitridosilicate-based phosphor, a blue light-emitting element having an emission peak in a blue-based wavelength region of 440 nm to less than 500 nm, preferably, 450 nm to 480 nm, is used; the nitridosilicate-based phosphor is excited with blue-based light emitted by the blue light-emitting element; and the apparatus emits light containing at least a blue-based light component emitted by the blue light-emitting element and an emission component emitted by the nitridosilicate-based phosphor, as output light, a high-luminous light-emitting apparatus that has a high red light component intensity and emits warm color based light can be configured, which is preferable.

The nitridosilicate-based phosphor also can be any phosphor of blue, green, yellow or red depending upon the composition. Therefore, the nitridosilicate-based phosphor can be used for at least one of the above-mentioned blue phosphor, green phosphor, yellow phosphor, and red phosphor.

As the above-mentioned blue phosphor, green phosphor, yellow phosphor, and red phosphor, other than the nitridosilicate-based phosphor, a $(Ba, Sr)MgAl_{10}O_{17}:Eu^{2+}$ blue phosphor, a $(Sr, Ca, Ba, Mg)_{10}(PO_4)_6Cl_2:Eu^{2+}$ blue phosphor, a $(Ba, Sr)_2SiO_4:Eu^{2+}$ green phosphor, a $BaMgAl_{10}O_{17}:Eu^{2+}, Mn^{2+}$ green phosphor, a $Y_2SiO_5:Ce^{3+}, Tb^{3+}$ green phosphor, a $(Y, Gd)_3Al_5O_{12}:Ce^{3+}$ yellow phosphor, a $Y_3Al_5O_{12}:Ce^{3+}, Pr^{3+}$ yellow phosphor, a $(Sr, Ba)_2SiO_4:Eu^{2+}$ yellow phosphor, a $CaGa_2S_4:Eu^{2+}$ yellow phosphor, a $CaS:Eu^{2+}$ red phosphor, a $SrS:Eu^{2+}$ red phosphor, a $La_2O_2S:Eu^{3+}$ red phosphor, and the like can be used.

In the case where the above-mentioned M constituting a nitridosilicate-based phosphor (compound) with $Eu^{2+}$ ions added thereto as an activator is Sr, a high-performance red phosphor such as $Sr_2Si_5N_8:Eu^{2+}$ is obtained, and a phosphor preferable as a light-emitting apparatus can be provided.

Furthermore, in the case where the above-mentioned M constituting a nitridosilicate-based phosphor (compound) with $Eu^{2+}$ ions added thereto as an activator is Ba, for example, a high-performance green phosphor such as $BaSiN_2:Eu^{2+}$ is obtained, and a phosphor preferable for a light-emitting apparatus can be provided.

Conventionally, a red phosphor is known in which a nitridosilicate-based compound represented by a chemical formula: $M_xSi_yN_z$ (where x, y, and z are numerical values satisfying $z=2/3x+4/3y$) is used as a phosphor base material, and $Eu^{2+}$ ions are contained as a luminescent center. However, a phosphor in which a main component of M is Ba, and x=1 and y=1 is not known. Those skilled in the art would not easily expect that such a phosphor happens to be a green phosphor. Thus, the present invention relates to a nitridosilicate compound represented by a chemical formula: $BaSiN_2$ or a nitridosilicate phosphor represented by $BaSiN_2:Eu^{2+}$ and a light-emitting apparatus using the same.

The main component of M being Ba means that a half or more of M, preferably 80 atomic % or more of M, and more preferably all the M is Ba.

EXAMPLE 1

Hereinafter, a method for producing a $Sr_2Si_5N_8:Eu^{2+}$ phosphor will be described as Example 1 of a method for producing a nitridosilicate-based compound according to the present invention.

In Example 1, the following compounds were used as phosphor materials.

(1) 14.47 g of strontium carbonate powder ($SrCO_3$ with a purity of 99.9 mol %):

(2) 0.35 g of europium oxide powder ($Eu_2O_3$ with a purity of 99.9 mol %)

(3) 12.36 g of silicon nitride powder ($Si_3N_4$ with a purity of 99 mol %)

Furthermore, as a reducing agent (additional reducing agent) of the above-mentioned strontium carbonate and europium oxide, the following solid-state carbon was used.

(4) 1.20 g of carbon (graphite) powder (C with a purity of 99.9 mol %).

First, the phosphor materials and the additional reducing agent were sufficiently mixed with an automatic mortar in the air. The mixed powder was placed in an alumina crucible, and the crucible was placed at a predetermined position in an atmospheric furnace. Thereafter, for the purpose of degassing, the mixed powder was heated in an atmosphere of mixed gas of nitrogen and hydrogen (97 volume % of nitrogen, 3 volume % of hydrogen) at 800° C. for 5 hours, followed by provisional firing. After provisional firing, the mixed powder was heated in an atmosphere of the above-mentioned mixed gas of nitrogen and hydrogen at 1600° C. for 2 hours, followed by firing. For simplicity, aftertreatment such as cracking, classification, and washing was omitted.

COMPARATIVE EXAMPLE 1

For comparison, a $Sr_2Si_5N_8:Eu^{2+}$ phosphor also was produced by a conventional production method using a nitride of alkaline-earth metal. In production of a sample for comparison, the following compounds were used as phosphor materials.

(1) 25.00 g of strontium nitride powder ($Sr_3N_2$ with a purity of 99.5 mol %)

(2) 0.93 g of europium oxide powder ($Eu_2O_3$ with a purity of 99.9 mol %)

(3) 32.51 g of silicon nitride powder ($Si_3N_4$ with a purity of 99 mol %)

In production of the sample for comparison, carbon powder was not used as an additional reducing agent. The sample for comparison was produced by the same method and under the same conditions as those of the method for producing a $Sr_2Si_5N_8:Eu^{2+}$ phosphor of Example 1, except that strontium nitride powder was weighed in an atmosphere of nitrogen with a glove box, and the phosphor materials were manually mixed sufficiently in an atmosphere of nitrogen.

Hereinafter, the characteristics of fired materials ($Sr_2Si_5N_8:Eu^{2+}$ phosphors) obtained by the above-mentioned production methods will be described.

Figure 2:
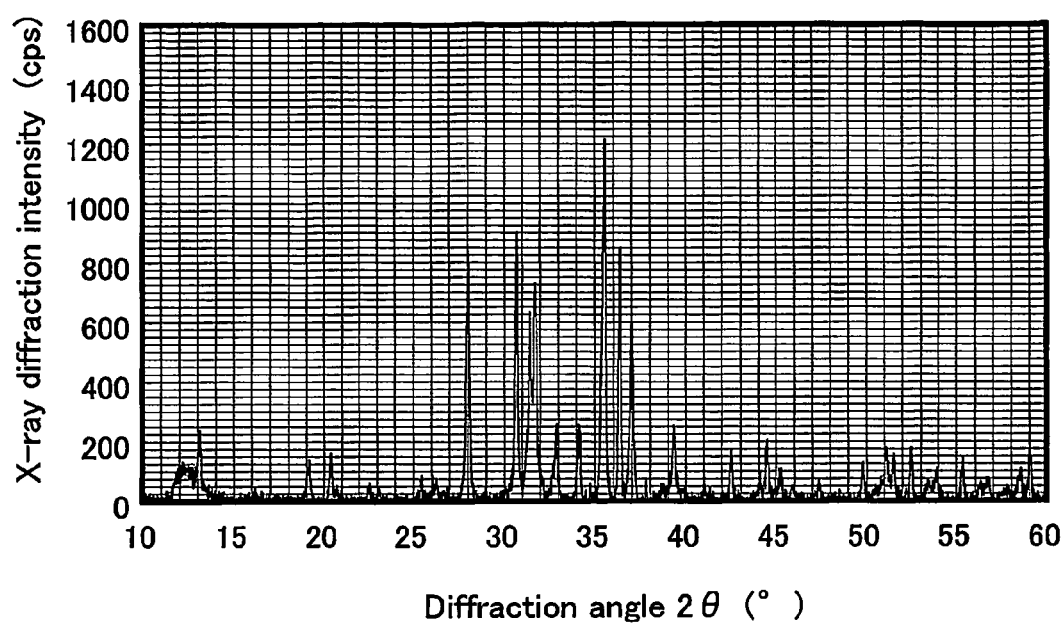
FIG. 2 shows an X-ray diffraction pattern of a nitridosilicate-based compound according to Example 1.

The body color of the fired materials were vivid orange. FIG. 2 shows an X-ray diffraction pattern of the fired material of Example 1 obtained by the above-mentioned production method. FIG. 2 shows that a main component of the fired material is a $Sr_2Si_5N_8$ compound.

Figure 3:
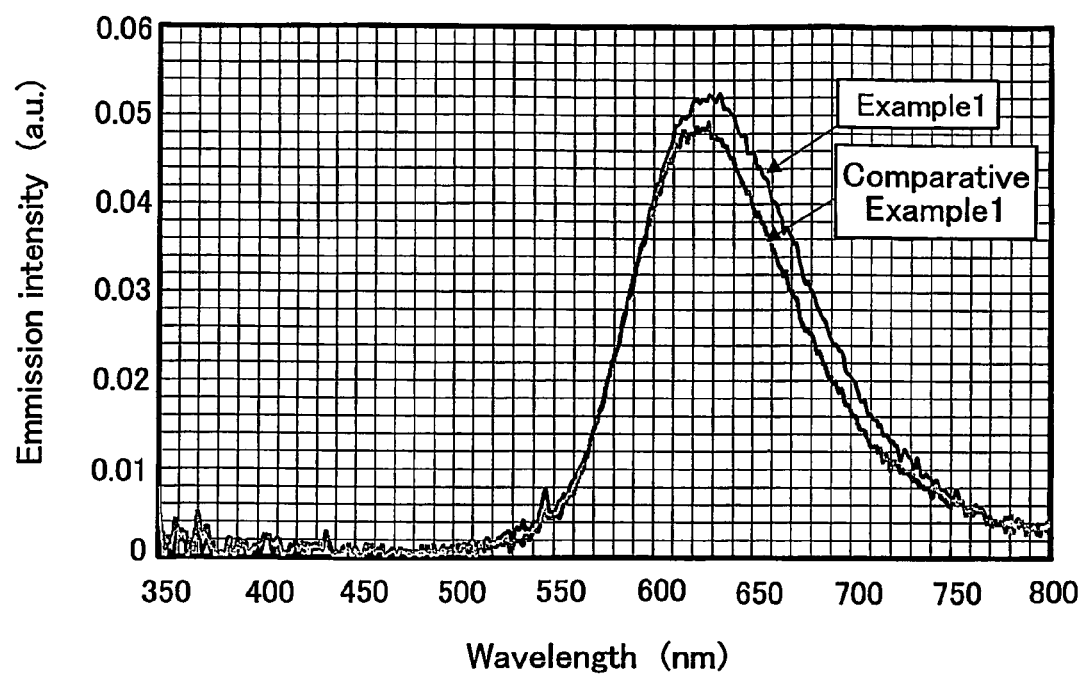
FIG. 3 shows emission spectra of nitridosilicate-based compounds according to Example 1 and Comparative Example 1.

FIG. 3 shows emission spectra of the fired materials of Example 1 and Comparative Example 1 under ultraviolet excitation of 254 nm. FIG. 3 shows that the fired materials are red phosphors having an emission peak in the vicinity of a wavelength of 633 nm. Furthermore, the height of the emission peak (emission intensity) of the red phosphor of Example 1 was 107% assuming that the emission intensity of the phosphor of Comparative Example 1 was 100%. Thus, the phosphor of Example 1 had higher brightness than that of the $Sr_2Si_5N_8:Eu^{2+}$ produced by the conventional production method. The chromaticity (x, y) of light emission on CIE chromaticity coordinates was x=0.605 and y=0.380.

Furthermore, the constituent elements of the above-mentioned fired materials were evaluated with an X-ray microanalyzer (XMA), revealing that the fired materials were compounds mainly containing Sr, Eu, Si, and N. Furthermore, a small amount of oxygen (O) was detected from the fired material of Comparative Example 1, whereas O was not substantially detected from the fired material of Example 1. The atomic ratio of metal elements constituting the fired material of Example 1 was close to Sr:Eu:Si=1.96:0.04:5.0

These results show that a $(Sr_{0.98}Eu_{0.02})_2Si_5N_8$ compound, i.e., a $Sr_2Si_5N_8:Eu^{2+}$ phosphor was produced by the production method of Example 1.

In Example 1, it is considered based on the following Chemical Formula 1 that SrO of an alkaline-earth metal oxide reacted with nitrogen and silicon nitride while being reduced with carbon (C) together with EuO of a lanthanide oxide, whereby a $(Sr_{0.98}Eu_{0.02})_2Si_5N_8$ compound was generated.

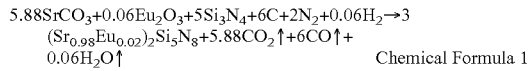

5.88$SrCO_3$+0.06$Eu_2O_3$+5$Si_3N_4$+6C+2$N_2$+0.06$H_2$→3$(Sr_{0.98}Eu_{0.02})_2Si_5N_8$+5.88$CO_2$↑+6CO↑+0.06$H_2O$↑  Chemical Formula 1

Thus, according to the production method of Example 1, a nitridosilicate-based compound was produced using, as a supply source of alkaline-earth metal, strontium carbonate that is easy to handle and inexpensive, without using Sr metal and $Sr_3N_2$ that are chemically unstable, are difficult to handle in the air, and are expensive.

In Example 1, the nitridosilicate-based compound mainly containing Sr as alkaline-earth metal and containing $Eu^{2+}$ ions as a luminescent center has been described. A nitrido-silicate-based compound mainly containing alkaline-earth metal (e.g., Ca and Ba) other than Sr, and a nitridosilicate-based compound containing luminescent center ions (e.g., $Ce^{3+}$ ions) other than $Eu^{2+}$ ions also can be produced by the same production method.

EXAMPLE 2

Hereinafter, a method for producing a $Eu_2Si_5N_8$ compound will be described as Example 2 of a method for producing a nitridosilicate-based compound according to the present invention.

The $Eu_2Si_5N_8$ compound was produced by the same production method and under the same firing condition as those of Example 1, except that the following materials were used as compound materials and an additional reducing agent.

(1) 7.04 g of europium oxide powder ($Eu_2O_3$ with a purity of 99.9 mol %)

(2) 4.94 g of silicon nitride powder ($Si_3N_4$ with a purity of 99 mol %)

(3) 0.48 g of carbon (graphite) powder (C with a purity of 99.9 mol %)

Hereinafter, the characteristics of a fired material ($Eu_2Si_5N_8$ compound) obtained by the above-mentioned production method will be described.

Figure 4:
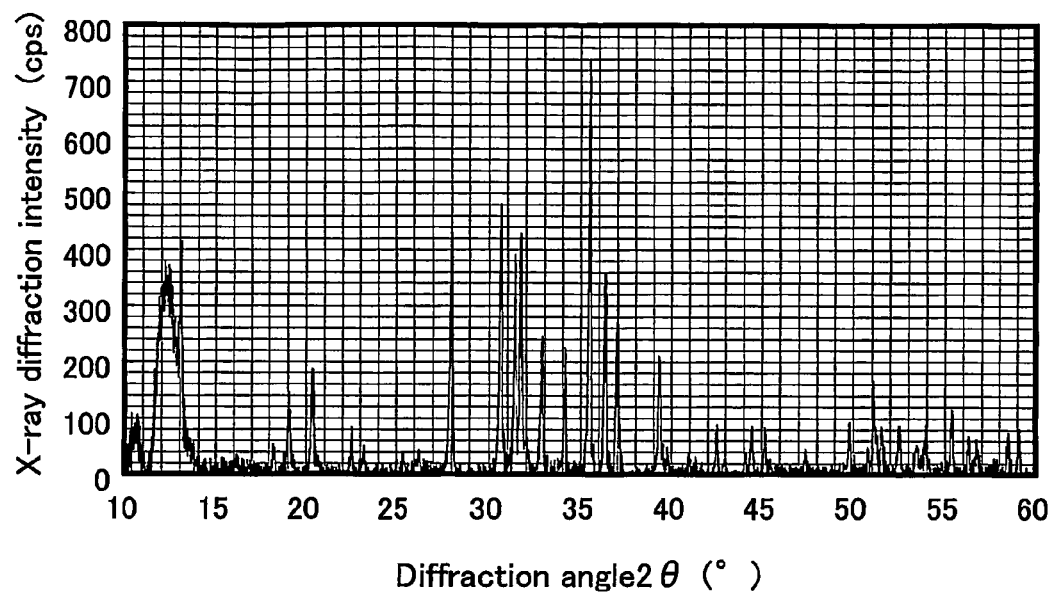
FIG. 4 shows an X-ray diffraction pattern of a nitridosilicate-based compound according to Example 2.

The body color of the fired material was deep red. FIG. 4 shows an X-ray diffraction pattern of the fired material obtained by the above-mentioned production method. FIG. 4 shows that a main component of the fired material is a $Eu_2Si_5N_8$ compound. Furthermore, although the data on an emission spectrum was omitted, the fired material had an emission peak in the vicinity of a wavelength of 720 nm by excitation of ultraviolet—near-ultraviolet—blue light, and exhibited light emission of deep red with a large spectrum half-value width of about 150 nm. The evaluation result of the constituent elements by XMA shows that the fired material is a compound containing Eu, Si, and N as main components, and the rough atomic ratio of the metal elements is Eu:Si=2:5. These results show that the $Eu_2Si_5N_8$ compound was produced by the production method of Example 2.

In Example 2, it is considered based on the following Chemical Formula 2 that EuO of a lanthanide oxide reacted with nitrogen and silicon nitride while being reduced with carbon (C), whereby a $Eu_2Si_5N_8$ compound was generated.

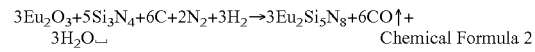

3$Eu_2O_3$+5$Si_3N_4$+6C+2$N_2$+3$H_2$→3$Eu_2Si_5N_8$+6CO↑+3$H_2O$↵  Chemical Formula 2

In Example 2, the nitridosilicate-based compound mainly containing Eu as a rare earth element has been described. Nitridosilicate-based compounds mainly containing rare earth elements other than Eu also can be produced by the same production method.

EXAMPLE 3

Hereinafter, a method for producing a $BaSiN_2:Eu^{2+}$ phosphor will be described as Example 3 of the method for producing a nitridosilicate-based compound according to the present invention.

In Example 3, the following compounds were used as phosphor materials.

(1) 19.34 g of barium carbonate powder ($BaCO_3$ with a purity of 99.9 mol %

(2) 0.35 g of europium oxide powder ($Eu_2O_3$ with a purity of 99.9 mol %)

(3) 4.94 g of silicon nitride powder ($Si_3N_4$ with a purity of 99 mol %)

Furthermore, as the reducing agent (additional reducing agent) for the above-mentioned barium carbonate and europium oxide, the following solid-state carbon was used.

(4) 1.20 g of carbon (graphite) powder (C with a purity of 99.9 mol %)

Using these phosphor materials and additional reducing agent, the $BaSiN_2:Eu^{2+}$ phosphor was produced by the same method and under the same condition as those of the $Sr_2Si_5N_8:Eu^{2+}$ phosphor of Example 1.

Hereinafter, the characteristics of the fired material (BaSiN$_2$:Eu$^{2+}$ phosphor) obtained by the above-mentioned production method will be described.

Figure 5:
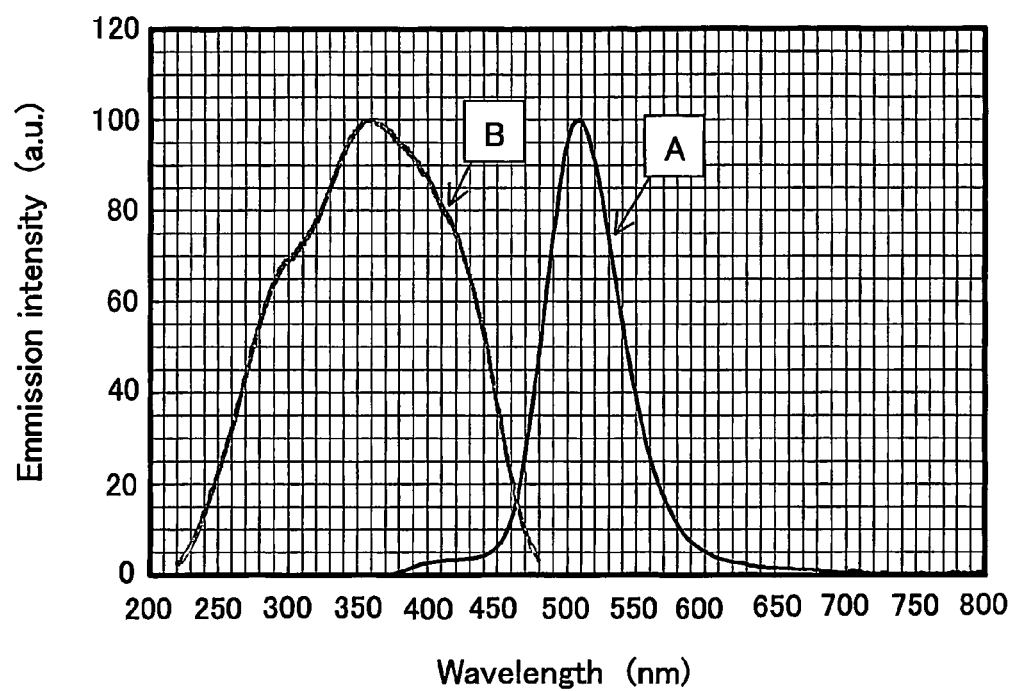
FIG. 5 shows an emission/excitation spectrum of a nitridosilicate-based compound according to Example 3.

The body color of the fired material was vivid green. FIG. 5 shows an emission spectrum A and an excitation spectrum B under ultraviolet excitation of 254 nm of the phosphor of Example 3 obtained by the above-mentioned production method.

FIG. 5 shows that the fired material can be excited with ultraviolet—near-ultraviolet—blue light in a wavelength of 220 to 470 nm and emits green light having an emission peak in the vicinity of a wavelength of 510 nm.

Furthermore, the constituent elements of the fired material were evaluated in the same way as in the phosphor of Example 1, revealing that the fired material was a compound mainly containing Ba, Eu, Si, and N, and the atomic ratio of the metal elements constituting the fired material was close to Ba:Eu:Si=0.98:0.02:1.0.

These results show that a $(Ba_{0.98}Eu_{0.02})SiN_2$ compound, i.e., a $BaSiN_2:Eu^{2+}$ phosphor can be produced by the production method of Example 3.

Conventionally, although a $CaSiN_2:Eu^{2+}$ phosphor emitting red light is known, those skilled in the art would not expect that the $CaSiN_2:Eu^{2+}$ phosphor happens to be a green phosphor when Ca is replaced by Ba. Furthermore, the emission intensity (peak height) of the $BaSiN_2:Eu^{2+}$ phosphor also is 10 times or more that of the $CaSiN_2:Eu^{2+}$ produced by the similar procedure, and has a remarkable effect that has not been achieved conventionally.

In Example 3, it is considered based on the following Chemical Formula 3 that BaO of an alkaline-earth metal oxide and EuO of a lanthanide oxide substantially reacted with nitrogen and silicon nitride while being reduced with carbon (C), whereby a $(Ba_{0.98}Eu_{0.02})SiN_2$ compound was generated.

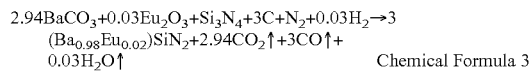

$2.94BaCO_3 + 0.03Eu_2O_3 + Si_3N_4 + 3C + N_2 + 0.03H_2 \rightarrow 3$
$(Ba_{0.98}Eu_{0.02})SiN_2 + 2.94CO_2\uparrow + 3CO\uparrow +$
$0.03H_2O\uparrow$  Chemical Formula 3

Thus, according to the production method of Example 3, a nitridosilicate-based compound represented by a chemical formula: $(Ba_{0.98}Eu_{0.02})SiN_2$ was produced using, as a supply source of alkaline-earth metal, barium carbonate that is easy to handle and inexpensive, without using Ba metal and $Ba_3N_2$ that are chemically unstable, are difficult to handle in the air, and are expensive.

In Examples 1 to 3, the $(Sr_{0.98}Eu_{0.02})_2Si_5N_8$ compound, the $Eu_2Si_5N_8$ compound, the $(Ba_{0.98}Eu_{0.02})SiN_2$ compound have been exemplified respectively. However, the method for producing a nitridosilicate-based compound of the present invention is applicable to nitridosilicate-based compounds other than those described above.

INDUSTRIAL APPLICABILITY

According to the method for producing a nitridosilicate-based compound of the present invention, a nitridosilicate-based compound is produced by reacting an alkaline-earth metal compound, capable of generating an alkaline-earth metal oxide by heating, or a rare earth compound, capable of generating a rare earth oxide by heating, with at least a silicon compound, while the alkaline earth metal compound or the rare earth compound is being reduced and nitrided by the reaction with carbon in an atmosphere of nitriding gas. Therefore, a nitridosilicate-based compound can be produced using, as a supply source of alkaline-earth metal or a rare earth element, an alkaline earth metal salt or a rare earth oxide that is easy to handle and is inexpensive, without using alkaline earth metal or a nitride of alkaline earth metal, or rare earth metal or a rare earth nitride, which is chemically unstable, is difficult to handle in the air, and is expensive. Thus, the present invention can be used for an application that requires a nitridosilicate-based compound with satisfactory material performance and a phosphor using the same to be produced industrially at low cost.

Furthermore, a nitridosilicate-based compound is produced by the above-mentioned production method; therefore, the present invention also can be applied widely to an application requiring an inexpensive nitridosilicate-based compound of high performance, and equipment and the like are configured using an inexpensive nitridosilicate-based compound of high performance. Consequently, the present invention also can be applied to an application requiring that an inexpensive product (LED light source, etc.) of high performance, adopting a nitridosilicate-based compound, is provided.

The invention claimed is:

1. A method for producing a nitridosilicate-based compound, comprising reacting
   a material containing an alkaline-earth metal compound capable of generating an alkaline-earth metal oxide MO by heating, where M is at least one element selected from Mg, Ca, Sr, and Ba; and O is oxygen,
   a silicon compound, and
   carbon
   in an atmosphere of nitriding gas,
   wherein the nitridosilicate-based compound is not a SIALON compound represented by a general formula: $M_{p/2}Si_{12-p-q}Al_{p+q}O_qN_{16-q}$ (where M is Ca or Ca combined with Sr; q is 0 to 2.5; and p is 1.5 to 3), and
   the reaction is performed by heating.

2. The method for producing a nitridosilicate-based compound according to claim 1, wherein the alkaline-earth metal compound is at least one compound selected from a carbonate, an oxalate, an oxide, and a hydride of alkaline-earth metal.

3. The method for producing a nitridosilicate-based compound according to claim 1, wherein the silicon compound is at least one compound selected from silicon nitride and silicon diimide.

4. The method for producing a nitridosilicate-based compound according to claim 1, wherein the nitriding gas is at least one gas selected from nitrogen gas and ammonia gas.

5. The method for producing a nitridosilicate-based compound according to claim 1, wherein the carbon is solid-state carbon.

6. The method for producing a nitridosilicate-based compound according to claim 1, wherein a nitridosilicate-based compound is produced in which the number of atoms of oxygen is smaller than that of alkaline-earth metal per mol of nitridosilicate-based compound.

7. The method for producing a nitridosilicate-based compound according to claim 1, wherein a compound represented by a general formula: $M_2Si_5N_8$, where M is at least one element selected from Mg, Ca, Sr, and Ba, is produced.

8. The method for producing a nitridosilicate-based compound according to claim 1, wherein the nitridosilicate-based compound is a nitridosilicate-based phosphor.

9. The method for producing a nitridosilicate-based compound according to claim 8, wherein the nitridosilicate-based phosphor is represented by a general formula selected from $M_2Si_5N_8:Eu^{2+}$, $M_2Si_4AlON_7:Eu^{2+}$, $MSiN_2:Eu^{7+}$, and $M_2Si_5N_8:Ce^{3+}$, where M is at least one element selected from Mg, Ca, Sr, and Ba.

10. The method for producing a nitridosilicate-based compound according to claim 8, wherein the nitriding gas is mixed gas of nitrogen and hydrogen.

11. A nitridosilicate phosphor comprising a nitridosilicate compound represented by a general formula: $MSiN_2$ as a phosphor base material, and $Eu^{2+}$ ions as a luminescent center, wherein a main component of the M is Ba.

12. A light-emitting apparatus using, as a light-emitting source, a nitridosilicate phosphor comprising a nitridosilicate compound represented by a general formula: $MSiN_2$ as a phosphor base material, and $Eu^{2+}$ ions as a luminescent center, wherein a main component of the M is Ba.

13. The method for producing a nitridosilicate-based compound according to claim 1, wherein the nitridosilicate-based compound is a nitridosilicate-based phosphor.

14. A method for producing a nitridosilicate-based compound, comprising reacting a material containing a rare earth compound capable of generating a rare earth oxide LnO or $Ln_2O_3$ by heating, where Ln is at least one element selected from rare earth elements of atomic numbers 21, 39, and 57-71; and O is oxygen, a silicon compound, wherein the silicon compound is at least one compound selected from silicon nitride and silicon diimide, and carbon in an atmosphere of nitriding gas.

* * * * *